United States Patent
Coxon et al.

(10) Patent No.: US 8,906,179 B2
(45) Date of Patent: Dec. 9, 2014

(54) SYSTEMS, TOOLS, AND METHODS FOR FORMING COMPOSITE TUBULAR STRINGERS AND STIFFENED COMPOSITE STRUCTURES HAVING COMPOSITE TUBULAR STRINGERS

(71) Applicant: The Boeing Company, Seal Beach, CA (US)

(72) Inventors: Brad Andrew Coxon, Everett, WA (US); Daniel M. Rotter, Lake Forest Park, WA (US); Brian G. Robins, Renton, WA (US); Wallace C. H. Chan, Bothell, WA (US); Bernhard Dopker, Bellevue, WA (US); Stephen Keith Kirchmeier, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/773,241

(22) Filed: Feb. 21, 2013

(65) Prior Publication Data

US 2014/0299262 A1    Oct. 9, 2014

(51) Int. Cl.
| | | |
|---|---|---|
| *B65H 81/00* | (2006.01) | |
| *F16J 15/20* | (2006.01) | |
| *B29C 70/00* | (2006.01) | |

(52) U.S. Cl.
CPC ..................................... *B29C 70/00* (2013.01)
USPC ........... 156/194; 156/189; 156/212; 156/242; 156/307.1; 264/257; 264/258; 264/294; 264/299; 264/320

(58) Field of Classification Search
CPC .... B29C 53/82; B29C 53/821; B29C 53/822; B29C 70/04; B29C 70/06; B29C 70/10; B29C 70/20; B29C 70/207
USPC ................. 156/184, 189, 194, 196, 199, 200, 156/202–204, 212, 213, 215, 217, 227, 156/173–175, 191, 198, 242, 245, 307.1, 156/307.5, 307.7; 264/257, 258, 285, 294, 264/299, 300, 310, 319, 320, 555, 563–565, 264/500

See application file for complete search history.

(56) References Cited

U.S. PATENT DOCUMENTS

| | | | |
|---|---|---|---|
| 4,452,657 A | | 6/1984 | Hamm |
| 4,505,769 A | * | 3/1985 | Auckenthaler ............... 156/217 |
| 5,122,417 A | * | 6/1992 | Murakami et al. ............ 428/371 |
| 6,743,504 B1 | * | 6/2004 | Allen et al. .................... 428/362 |
| 7,861,969 B2 | | 1/2011 | Guzman et al. |
| 8,043,554 B2 | | 10/2011 | Yip et al. |
| 2008/0246175 A1 | * | 10/2008 | Biornstad et al. ............. 264/109 |
| 2011/0139932 A1 | | 6/2011 | Matheson et al. |

* cited by examiner

*Primary Examiner* — John Goff
*Assistant Examiner* — Hannuri L Kwon
(74) *Attorney, Agent, or Firm* — DASCENZO Intellectual Property Law, P.C.

(57) ABSTRACT

Systems, tools, and methods for forming composite tubular stringers and stiffened composite structures having composite tubular stringers are disclosed. Systems include a tool, a supply of pliable blanks for forming composite tubular stringers with the tool, a supply of skin segments for forming a skin, and a layup mandrel for receiving the composite tubular stringers and the skin to form a stiffened composite structure. Tools include a wrapping mandrel for forming from a pliable blank a tubular structure with a first circumferential profile, and a transition mandrel for conforming the tubular structure to a second circumferential profile. Methods include wrapping a pliable blank around a wrapping mandrel to define a tubular structure having a first circumferential profile, and transitioning the tubular structure from having the first circumferential profile to having a second circumferential profile.

18 Claims, 4 Drawing Sheets

SYSTEMS, TOOLS, AND METHODS FOR FORMING COMPOSITE TUBULAR STRINGERS AND STIFFENED COMPOSITE STRUCTURES HAVING COMPOSITE TUBULAR STRINGERS

FIELD

The present disclosure relates to stiffened composite structures.

BACKGROUND

Stiffened composite structures are structures that are constructed of composite materials, such as fiber reinforced composite materials, and typically include some form of structural support that carries a skin. Some modern aircraft fuselages are examples of stiffened composite structures that include a skin operatively coupled to (i) frame members that extend circumferentially around and that are spaced longitudinally along the inside of the fuselage and (ii) stringers that extend longitudinally along and that are spaced circumferentially around the inside of the fuselage. A common stringer configuration utilized in stiffened composite fuselages are referred to as hat-shaped stringers, because they include opposing flanges and generally define a trapezoidal volume when viewed in cross-section. The flanges provide surfaces for operative coupling of the stringers to the skin of the composite fuselage. When operatively coupled to the skin, the flanges create steps, or joggles, at the terminuses of the flanges relative to the skin. These steps may add complexity or introduce less than desirable characteristics in the overall structure.

SUMMARY

Systems, tools, and methods for forming composite tubular stringers and stiffened composite structures having composite tubular stringers, as well as apparatuses that include composite tubular stringers, are disclosed herein.

Tools according to the present disclosure include a wrapping mandrel and a transition mandrel. The wrapping mandrel has an outer surface with a generally uniform perpendicular cross-sectional shape along its length. The transition mandrel has an outer surface with a non-uniform perpendicular cross-sectional shape along its length that transitions from a first shape corresponding to the shape of the wrapping mandrel to a second shape that is different from the shape of the wrapping mandrel. In some embodiments, the perpendicular cross-sectional shape of the wrapping mandrel is circular. In some embodiments, the transition mandrel is operatively coupled to the wrapping mandrel. In some embodiments, the wrapping mandrel and the transition mandrel define a unitary structure. In some embodiments, the wrapping mandrel and the transition mandrel define separate and distinct structures. Some tools also include a cure mandrel that has an outer surface with a generally uniform perpendicular cross-sectional shape along its length that corresponds to the second shape of the transition mandrel.

Systems according to the present disclosure include a tool according to the present disclosure, a supply of pliable blanks for forming with the tool a plurality of composite tubular stringers of a stiffened composite structure, a supply of skin segments for forming a skin of the stiffened composite structure, and a layup mandrel for receiving the plurality of composite tubular stringers and the skin for forming the stiffened composite structure. Some systems also include a supply of cure mandrels for carrying a respective composite tubular stringer for loading on the layup mandrel.

Methods according to the present disclosure of forming a composite tubular stringer include wrapping a pliable blank around a wrapping mandrel to define a tubular structure having a first circumferential profile with a continuous perimeter, and following the wrapping, transitioning the tubular structure from having the first circumferential profile to having a second circumferential profile that is different from the first circumferential profile to thereby define the composite tubular structure. Some methods also include translating the tubular structure from around the wrapping mandrel to around a cure mandrel.

Methods according to the present disclosure of forming a stiffened composite structure include performing a method of forming a composite tubular stringer, repeating the performing to form a plurality of composite tubular stringers, operatively loading the plurality of composite tubular stringers on a layup mandrel, and operatively loading a skin segment on the layup mandrel relative to the plurality of composite tubular stringers.

Stiffened composite structures according to the present disclosure, such as aircraft, include a composite tubular stringer having a continuous perimeter. Composite tubular stringers also may be described as flangeless stringers.

DESCRIPTION

Figure 1:
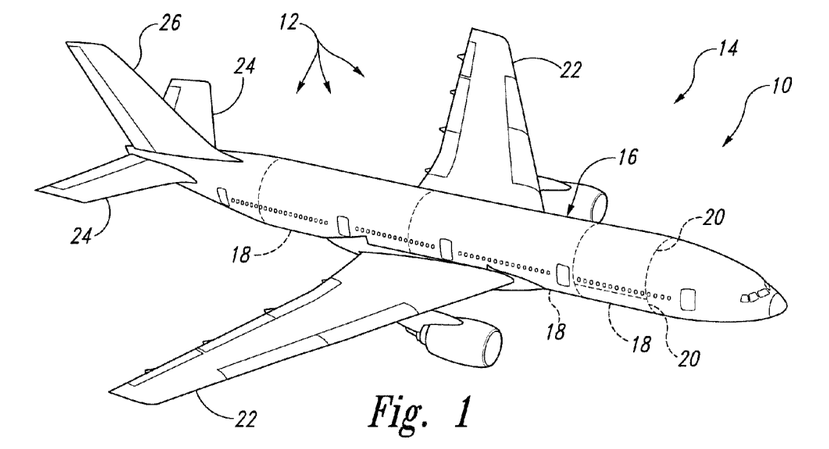
FIG. 1 is a perspective view of an illustrative, non-exclusive example of a stiffened composite structure in the form of an aircraft.

Systems, tools, and methods for forming composite tubular stringers and stiffened composite structures having composite tubular stringers, as well as apparatuses that include composite tubular stringers, are disclosed herein. In FIG. 1, an example of an apparatus 10 that may be constructed from stiffened composite structures 12 that include composite tubular stringers 36 is provided in the form of an aircraft 14; however, other apparatuses 10 are within the scope of the present disclosure, and the present disclosure is not limited to aircraft and aircraft applications. For example, as illustrative, non-exclusive examples, other apparatuses 10 that may include composite tubular stringers 36 include (but are not limited to) spacecraft, watercraft, land vehicles, wind turbines, structural towers and masts, etc. Moreover, aircraft 14 may take any suitable form, including commercial aircraft, military aircraft, private aircraft, or any other suitable aircraft.

While FIG. 1 illustrates aircraft 14 in the form of a fixed wing aircraft, other types and configurations of aircraft are within the scope of aircraft 14 according to the present disclosure, including (but not limited to) helicopters.

Aircraft 14 include a fuselage 16, which generally corresponds to the main body of the aircraft 14 for holding passengers, crew, cargo, and/or equipment, for example, depending on the particular configuration and/or function of an aircraft 14. Typically, although not required, the fuselage 16 of an aircraft 14 is elongate and somewhat cylindrical or tubular. In some embodiments, the fuselage 16 may be constructed of multiple sections 18 that are longitudinally spaced along the fuselage 16 and operatively coupled together to define the fuselage 16. As used herein when referencing an aircraft 14, a fuselage 16, a corresponding stiffened composite structure 12, and/or a corresponding tubular stringer 36, the longitudinal direction refers to the fore-aft direction, corresponding to a longitudinal, or long, axis, of the fuselage 16, and/or corresponding to the longitudinal direction of the tubular stringer 36. Additionally, the terms "inner" and "outer" when used in connection with an aircraft 14, a fuselage 16, and/or a corresponding stiffened composite structure 12 refer to the radially inward side and the radially outward side, respectively, of the corresponding stiffened composite structure. Accordingly, the outer side of a fuselage 16 or a component part thereof generally faces away from the fuselage 16, and the inner side of a fuselage 16 or a component part thereof generally faces the internal volume that is defined by the fuselage 16. Similar relative terms may be used with respect to stiffened composite structures 12 other than fuselages 16 and with respect to apparatuses 10 other than aircraft 14.

In FIG. 1, three fuselage sections 18 are indicated schematically; however, any number or size and shape of sections 18 may be used to construct a fuselage 16. Sections 18 additionally or alternatively may be referred to as barrel sections 18 of a fuselage 16, with each barrel section 18 generally defining a length of the fuselage 16. Additionally or alternatively, as schematically illustrated in FIG. 1, a section 18 may include, or be constructed of, more than one subsection 20. In the schematically illustrated and optional example of FIG. 1, a section 18 is shown schematically and optionally to include an upper subsection 20 and a lower subsection 20; however, a section 18 may be constructed of any suitable number, configuration, and placement of subsections 20, including no subsections 20 at all.

Aircraft 14 also may include wings 22, horizontal stabilizers 24, and a vertical stabilizer 26, each of which may be constructed as a unitary structure or in subsections that are subsequently assembled together. One or more of a fuselage 16, a fuselage section 18, a fuselage subsection 20, a wing 22, a horizontal stabilizer 24, a vertical stabilizer 26, or a structural subsection thereof may be constructed of and/or may be described as a stiffened composite structure 12, such as including composite stringers 36 according to the present disclosure.

Figure 2:
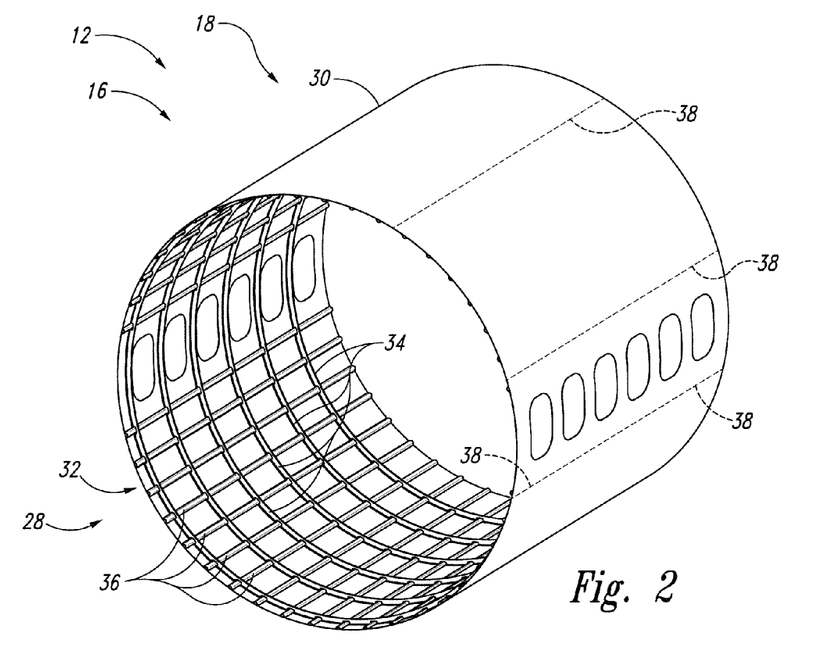
FIG. 2 is an isometric view of an illustrative, non-exclusive example of a stiffened composite structure in the form of a barrel section of an aircraft.

Stiffened composite structures 12 according to the present disclosure generally encompass structures that are defined by a structural support 28 and a skin 30 that is operatively coupled to and supported by the structural support 28. FIG. 2 depicts an illustrative, non-exclusive example of a stiffened composite structure 12 in the form of a barrel section 18 of a fuselage 16 of an aircraft 14. The skin 30 may be described as defining the outer shape of the fuselage 16. As indicated in FIG. 2, structural supports 28 include a plurality of stiffeners 32 operatively coupled to the skin 30. In the example of fuselage 16, the stiffeners 32 include a plurality of frame members, or frames, 34 that are operatively coupled to and that extend circumferentially around the inner side of the skin 30 and that are spaced longitudinally along the fuselage 16. The stiffeners 32 also include a plurality of composite tubular stringers 36 that are operatively coupled to and that extend longitudinally along the inner side of the skin 30 and that are spaced circumferentially around the fuselage 16. In some embodiments of stiffened composite structures 12, although not required, the skin 30 may be constructed of a plurality of skin segments 38 that collectively define the skin 30, or at least a portion of the skin 30 of a stiffened composite structure 12.

Figure 3:
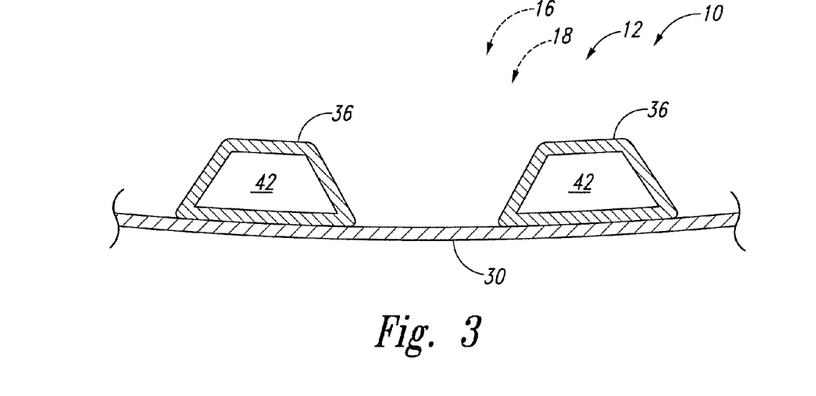
FIG. 3 is a fragmentary cross-sectional view of a portion of an apparatus that includes composite tubular stringers.

FIG. 3 illustrates a portion of an illustrative, non-exclusive example of a stiffened composite structure 12 that includes composite tubular stringers 36 that are operatively coupled to a skin 30. For example, the illustrated stiffened composite structure 12 of FIG. 3 may represent a portion of a section 18 of a fuselage 16; however, FIG. 3 broadly represents any stiffened composite structure 12 or apparatus 10 according to the present disclosure that includes one or more composite tubular stringers 36 according to the present disclosure. As seen in FIG. 3, a tubular stringer 36 has a continuous perimeter, or circumferential profile, and defines an internal volume, or cavity, 42. Tubular stringers 36 additionally or alternatively may be described as flangeless stringers 36, because they do not include the opposing flanges of prior art stringers. Tubular stringers 36 may take any suitable shape and may be described in terms of the shape of a perpendicular circumferential, or cross-sectional, profile or shape. That is, the perpendicular cross-section of a tubular stringer 36 may take a variety of shapes, with FIG. 3 illustrating only one illustrative, non-exclusive example. For example, the circumferential profile of a tubular stringer 36 may be generally polygonal, generally quadrilateral, generally trapezoidal, generally isosceles trapezoidal, and/or generally mound shaped with a generally flat base; however, other shapes also are within the scope of the present disclosure. By "generally," for example in the context of a "generally polygonal shape," it meant that the shape may not be a perfect shape, such as having straight sides and pointed corners, but that the overall shape may somewhat resemble, or include characteristics of, the identified shape, for example, having rounded corners or slightly curved sides, etc. The example tubular stringers 36 illustrated in FIG. 3, for example, may be described as having cross-sectional circumferential profiles that are generally isosceles trapezoidal in shape.

Figure 4:
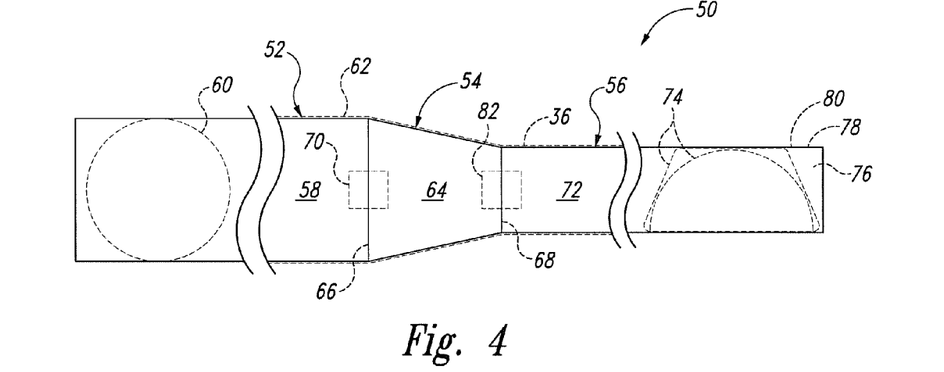
FIG. 4 is a schematic representation of tools for forming composite tubular stringers.

FIG. 4 schematically represents illustrative examples of tools 50 for forming tubular stringers 36 from a pliable blank of material. The pliable blanks may be constructed of any suitable material having desired properties both for formation of the tubular stringer 36 and for the ultimate application of the tubular stringer 36. As an illustrative, non-exclusive example, the pliable blanks may be constructed of fiber reinforced composite material. As used herein, a fiber reinforced composite material should be understood to include at least an epoxy or other polymer or binding material together with fibers, such as (but not limited to) carbon fibers, boron fibers, para-aramid (e.g., Kevlar®) fibers, and/or other fibers. In some embodiments, the fibers may be woven into a fabric. In some embodiments, the pliable blanks may be (but are not required to be) constructed of multiple layers, or plies, of fiber reinforced composite material. In some such embodiments, the angles of the fibers may be varied between plies. In some embodiments, the plies may be pre-preg plies, which are layers, or sheets, of fibers that are pre-impregnated with the associated binding material. Accordingly, multiple pre-preg plies may be layered to collectively define a segment of fiber reinforced composite material having desired properties and characteristics. The binding material of pre-preg plies may be partially cured, or pre-cured, so as to permit handling of the plies and selective assembly of the plies. Typically, pre-preg plies are tacky to the touch and therefore easily stick together when layered, but not necessarily in a permanent fashion. That is, when layered, two adjacent plies may be permitted to translate laterally relative to each other and/or may be able to be separated, if so desired. To more permanently affix adjacent layers of plies together, the layered plies may be compacted, or compressed, together, utilizing any suitable method and at any suitable and various times during the construction of a fiber reinforced composite structure. This compression of two or more layers is referred to as compaction, or as compacting, of the plies.

As schematically illustrated in FIG. 4, tools 50 include at least a wrapping mandrel 52 and a transition mandrel 54, and in some embodiments also may be described as including a cure mandrel 56, which additionally or alternatively may be described as a cure bladder 56.

The wrapping mandrel 52 has an outer surface 58 that has a generally uniform perpendicular cross-sectional shape 60 and a generally uniform perpendicular cross-sectional circumference along the length of the wrapping mandrel 52. In FIG. 4, the shape 60 of the wrapping mandrel 52 is schematically illustrated as a circle; however, other shapes also are within the scope of the present disclosure, including ellipses, ovals, and polygons. By "generally uniform perpendicular cross-sectional shape," it meant that the cross-sectional shape 60 is generally the same along the length of the wrapping mandrel 52, or at least along a substantial length of the wrapping mandrel 52. Similarly, by "generally uniform perpendicular cross-sectional circumference," it is means that the circumference is generally constant along the length of the wrapping mandrel 52, or at least along a substantial length of the wrapping mandrel 52.

The outer surface 58 of the wrapping mandrel 52 is configured to receive a pliable blank so that the pliable blank is conformed to the outer surface 58 of the wrapping mandrel 52 to define a tubular structure 62. Any suitable process may be utilized to conform a pliable blank to the outer surface 58 of the wrapping mandrel 52 to form a tubular structure 62. For example, a typical table rolling machine may be used to roll, or wrap, a pliable blank around and on the outer surface 58 to form the tubular structure 62.

The outer surface 58 of the wrapping mandrel 52 also is configured to permit translation of the tubular structure 62 relative to the wrapping mandrel 52. That is, the wrapping mandrel 52 is configured to permit sliding of the tubular structure 62 relative to the wrapping mandrel 52 while the tubular structure 62 is engaged with the outer surface 58 of the wrapping mandrel 52. For example, the outer surface 58 may be described as having low-friction properties or as being defined by a low-friction material, illustrative, non-exclusive examples of which include (but are not limited to) polytetrafluoroethylene and polyoxymethylene.

The transition mandrel 54 has an outer surface 64 that has a non-uniform perpendicular cross-sectional shape along the length of the transition mandrel 54. In other words, the cross-sectional shape of the transition mandrel is different at different points along its length. Specifically, at a first end 66 of the transition mandrel 54, the cross-sectional shape corresponds to the cross-sectional shape 60 of the wrapping mandrel 52, and at a second end 68 of the transition mandrel 54, the cross-sectional shape does not correspond to, and is different from, the cross-sectional shape 60 of the wrapping mandrel 52. However, the outer surface 64 of the transition mandrel 54 has a generally uniform perpendicular cross-sectional circumference along its length. In other words, the circumference at the first end 66 of the transition mandrel 52 is the same as the circumference at the second end 68 of the transition mandrel, as well as at all points between the first end 66 and the second end 68. Moreover, the perpendicular cross-sectional circumference of the transition mandrel 54 is equal to, or at least approximately equal to, the perpendicular cross-sectional circumference of the wrapping mandrel 52. As a result, when portions of the tubular structure 62 are translated off of the wrapping mandrel 52 and onto the transition mandrel 54, the tubular structure smoothly conforms to the changing shape of the transition mandrel 54 along its length, eventually resulting in the tubular structure 62 defining a tubular stringer 36, the entire length of which has a perpendicular cross-sectional shape corresponding to the shape at the second end 68 of the transition mandrel 54. As illustrative, non-exclusive examples, the circumference of the wrapping mandrel 52 and/or the circumference of the transition mandrel 54 may be in the range of 1-5, 1-10, 1-20, 1-30, 1-50, 5-50, 5-30, 5-20, 5-10, 10-50, 10-30, 10-20, 20-50, 20-30, or 30-50 inches; however, other ranges and values of circumferences also are within the scope of the present disclosure. Illustrative, non-exclusive examples of suitable shapes corresponding to the second end 68 of the transition mandrel 54 include non-circular shapes, such as (but not limited to) generally polygonal shapes, generally quadrilateral shapes, generally trapezoidal shapes, generally isosceles trapezoidal shapes, generally mound shaped with a generally flat base, shapes having a generally flat side and a generally curvilinear side, or shapes having a generally flat side and a generally convex side.

The outer surface 64 of the transition mandrel 54 is configured to receive the tubular structure 62 from the outer surface 58 of the wrapping mandrel 52 and to permit translation of the tubular structure 62 relative to the transition mandrel 54 to conform the tubular structure 62 to the shape at the second end 68 of the transition mandrel 54 and thus to form a tubular stringer 36 from the tubular structure 62. That is, like the wrapping mandrel 52, the transition mandrel 54 is configured to permit sliding of the tubular structure 62 relative to the transition mandrel 54 while the tubular structure 62 is engaged with the outer surface 64 of the transition mandrel 54. For example, the outer surface 64 may be described as having low-friction properties or as being defined by a low-friction material, illustrative, non-exclusive examples of which include (but are not limited to) polytetrafluoroethylene and polyoxymethylene.

In FIG. 4, the first end 66 of the transition mandrel 54 is schematically illustrated as being directly adjacent to the wrapping mandrel 52. In some embodiments, the transition mandrel 54 may be operatively coupled to the wrapping mandrel 52. In some embodiments, the transition mandrel 54 may be configured to be selectively and operatively coupled to and decoupled from the wrapping mandrel 52. In some such embodiments, the tool 50 may include a coupling structure 70 that is configured to permit operative coupling and decoupling of the wrapping mandrel 52 and the transition mandrel 54. In such embodiments, the coupling structure 70 may be configured to index, or otherwise appropriately align, the transition mandrel 54 with the wrapping mandrel 52 to ensure a smooth transition from the outer surface 58 of the wrapping mandrel 52 to the outer surface 64 of the transition mandrel 54, and thus to ensure a smooth translation of a tubular structure 62 from around the wrapping mandrel 52 to around the transition mandrel 54.

In some embodiments, the wrapping mandrel 52 and the transition mandrel 54 may define separate and distinct structures. In other embodiments, the wrapping mandrel 52 and the transition mandrel 54 may define a single unitary structure. Wrapping mandrels 52 and transition mandrels 54 may be constructed of any suitable materials, illustrative, non-exclusive examples of which include metals, such as hard steels, having coatings of the aforementioned optional low-friction materials; however, other materials and configurations also are within the scope of the present disclosure.

Typically, and as schematically illustrated in FIG. 4, the wrapping mandrel 52 is longer than the transition mandrel 54. As illustrative, non-exclusive examples, the length of the wrapping mandrel may be greater than 2, 6, 8, 10, 15, 20, 30, 40, or 50 feet, such as corresponding to stringers 36 of similar length. In contrast, the length of the transition mandrel 54 may be less than 10, 8, 6, 4, or 2 feet to permit operative transition of the tubular structure 62 from the shape 60 of the wrapping mandrel 52 to the shape of the second end 68 of the transition mandrel 54. Other ranges and values of lengths also are within the scope of the present disclosure.

The translation of a tubular structure 62 from around the wrapping mandrel 52 to around the transition mandrel 54 may be accomplished in any suitable manner. For example, the wrapping mandrel 52 and the transition mandrel 54 may be generally stationary, or otherwise grounded, and the tubular structure 62 may be selectively translated relative to the wrapping mandrel 52 and the transition mandrel 54, such as by a machine or person directly or indirectly translating the tubular structure 62. Alternatively, the tubular structure 62 may be generally stationary, or otherwise grounded, and the wrapping mandrel 52 and the transition mandrel 54 may be selectively translated relative to the tubular structure 62, such as by a machine or person directly or indirectly translating the wrapping mandrel 52 and the transition mandrel 54. Other systems and mechanisms for operative translation of a tubular structure 62 relative to the wrapping mandrel 52 and the transition mandrel 54 also are within the scope of the present disclosure.

In some embodiments, as schematically illustrated in FIG. 4, a tool 50 also includes a cure mandrel 56. The cure mandrel 56 has an outer surface 72 that has a generally uniform perpendicular cross-sectional shape 74 and a generally uniform perpendicular cross-sectional circumference along the length of the cure mandrel 56. The shape 74 corresponds to the shape at the second end 68 of the transition mandrel 54. In other words, the cure mandrel 56 has the same cross-sectional shape as the second end 68 of the transition mandrel 54. In FIG. 4, two optional shapes 74 are schematically illustrated, and as discussed with reference to the shape of the second end 68 of the transition mandrel 54, illustrative, non-exclusive examples of shapes 74 include non-circular shapes, such as (but not limited to) generally polygonal shapes, generally quadrilateral shapes, generally trapezoidal shapes, generally isosceles trapezoidal shapes, generally mound shaped with a generally flat base, shapes having a generally flat side and a generally curvilinear side, or shapes having a generally flat side and a generally convex side.

The outer surface 72 of the cure mandrel 56 is configured to receive the tubular structure 62 from the outer surface 64 of the transition mandrel 54 and to permit translation of the tubular structure 62 relative to the cure mandrel 56. That is, like the wrapping mandrel 52 and the transition mandrel 54, the cure mandrel 56 is configured to permit sliding of the tubular structure 62 relative to the cure mandrel 56 while the tubular structure 62 is engaged with the outer surface 72 of the cure mandrel 56. Because the cure mandrel 56 has the same cross-sectional shape 74 as the second end 68 of the transition mandrel 54, once the tubular structure 62 is positioned fully on the cure mandrel 56, the tubular structure 62 may be referred to as a tubular stringer 36. In other words, upon the tubular structure 62 fully translating over the transition mandrel 54, and thus conforming to the shape of the second end 68 of the transition mandrel 54, the entirety of the tubular structure 62 will have been conformed to the shape of the second end 68 of the transition mandrel 54. The length of the cure mandrel 56, therefore, typically approximately or generally is equal to the length of the wrapping mandrel 52.

The perpendicular cross-sectional circumference of the cure mandrel 56 generally is equal to the perpendicular cross-sectional circumference of the wrapping mandrel 52 and/or the transition mandrel 54. In some embodiments, it may be desirable for the circumference of the cure mandrel 56 to be slightly less than the circumference of the wrapping mandrel 52 and/or the transition mandrel 54, for example, in the range of 0-1% less, such as to permit a smooth transition of the tubular structure 62 from around the transition mandrel 54 to around the cure mandrel 56 when being translated from the wrapping mandrel 52 to the cure mandrel 56 via the transition mandrel 54.

Cure mandrels 56 are structures that are positioned within the tubular stringers 36, so that when a skin 30 is operatively affixed to the tubular stringer 36, the cure mandrel 56 provides structure for receiving a compaction force and for restricting undesired deformation of the tubular stringer 36. Cure mandrels 56 are referred to as such, because typically they remain in place within the cavity 42 defined by the tubular stringer 36 during the curing process of a corresponding stiffened composite structure 12 that includes tubular stringers 36. In some embodiments, the cure mandrel 56 may include a body 76, a breather sock 78 extending over the body 76, and heat shrink material 80 extending over the breather sock 78. Whether or not a cure mandrel 56 includes a breather sock 78 and/or a layer of heat shrink material 80, as discussed herein, the outer surface 72 of the cure mandrel 56 is configured to permit sliding of the tubular structure 62 relative to the cure mandrel 56 while the tubular structure 62 is engaged with the outer surface 72 of the cure mandrel 56. That is, the outer surface 72 of the cure mandrel 56 is configured generally to not stick, or adhere, to composite materials before and/or after curing of an associated tubular stringer 36. In some embodiments, the outer surface 72 may be described as having low-friction properties or as being defined by a low-friction material, illustrative, non-exclusive examples of which include (but are not limited to) polytetrafluoroethylene and polyoxymethylene.

As schematically illustrated in FIG. 4, a tool 50 also may include a fixture 82, or other alignment structure 82, for operatively aligning the cure mandrel 56 with the transition mandrel 56 so that the tubular structure 62 may be operatively translated from around the wrapping mandrel 52 to around the cure mandrel 56 via the transition mandrel 54. As discussed herein, any suitable system or mechanism may be utilized for operatively translating a tubular structure 62 from around the wrapping mandrel 52 to around the transition mandrel 54. Similarly, any suitable system of mechanism may be utilized for operatively translating a tubular structure 62 from around the transition mandrel 54 to around an optional cure mandrel 56. For example, the cure mandrel 56 may be stationary, or otherwise grounded (optionally together with the wrapping mandrel 52 and the transition mandrel 54), and the tubular structure 62 may be selectively translated onto and around the cure mandrel 56, such as by a machine or person directly or indirectly translating the tubular structure 62. Alternatively, the tubular structure 62 may be generally stationary, or otherwise grounded, and the cure mandrel 56 (optionally together with the wrapping mandrel 52 and the transition mandrel 54) may be selectively translated relative to the tubular structure, such as by a machine or person directly or indirectly translating the cure mandrel 56.

Figure 5:
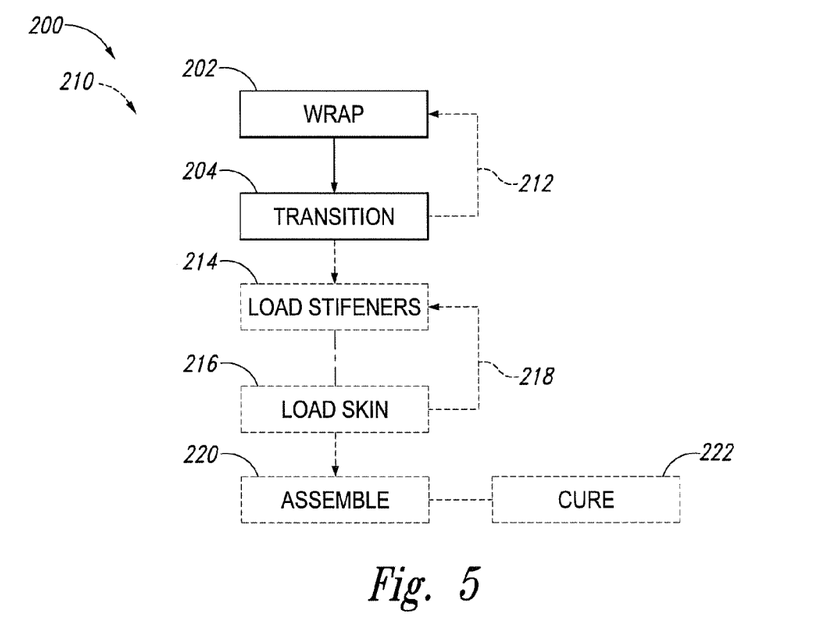
FIG. 5 is a flowchart schematically representing methods of forming composite tubular stringers and methods of forming stiffened composite structures.

Turning now to FIG. 5, illustrative, non-exclusive examples of methods 200 of forming tubular stringers 36, such as utilizing tools 50 according to the present disclosure, are schematically presented. A method 200 may include wrapping a pliable blank around a wrapping mandrel 52 to define a tubular structure 62 having a first circumferential profile (perpendicular cross-sectional shape 60) with a continuous perimeter, as indicated at 202, and following the wrapping 202, transitioning the tubular structure 62 from having the first circumferential profile to having a second circumferential profile that is different from the first circumferential profile to thereby define a tubular stringer 36, as indicated at 204. In methods 200 that utilize a tool 50, the second circumferential profile corresponds to the perpendicular cross-sectional shape of the second end 68 of the transition mandrel 54.

In some methods 200, the transitioning 204 includes translating the tubular structure 62 from around the wrapping mandrel 52 to around a cure mandrel 56 that has a generally uniform perpendicular cross-sectional shape 74 that corresponds to the second circumferential profile of the tubular structure 62. In methods 200 that utilize a tool 50, the translating includes translating the tubular structure 62 from around the wrapping mandrel 62 to around the cure mandrel 56 via the transition mandrel 54. As discussed herein, this operative translation of the tubular structure 62 may be accomplished by directly or indirectly translating the tubular structure 62 relative to the wrapping mandrel 52, the transition mandrel 54, and the cure mandrel 56, or it may be accomplished by directly or indirectly translating the wrapping mandrel 52, the transition mandrel 54, and the cure mandrel 56 relative to the tubular structure 62. Additionally or alternatively, it may be accomplished by a combination of the two. Any suitable system and/or mechanism may be utilized.

Figure 6:
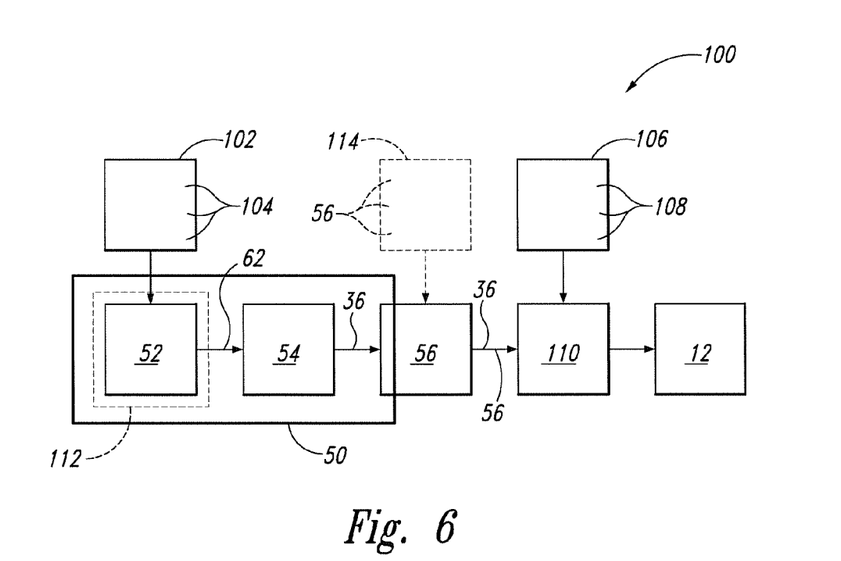
FIG. 6 is a schematic diagram representing systems for assembling stiffened composite structures that include composite tubular stringers.

FIG. 5 also schematically represents illustrative, non-exclusive examples of methods 210 of forming, or assembling, a stiffened composite structure 12 that includes one or more tubular stringers 36, and FIG. 6 provides a schematic representation of illustrative, non-exclusive examples of systems 100 for assembling stiffened composite structures 12 that include one or more tubular stringers 36. A tool 50 according to the present disclosure is not required to be utilized with a system 100 or with a method 210 according to the present disclosure, and systems 100 and methods 210 represent only non-exclusive examples of applications of tools 50. FIG. 6 additionally or alternatively may be described as schematically representing, or illustrating, the flow of materials through a manufacturing facility, with the flow of materials ultimately resulting in a stiffened composite structure 12, and optionally resulting in a fully assembled apparatus 10.

With reference to FIG. 6, a system 100 may include a tool 50, a supply 102 of pliable blanks 104 for forming tubular stringers 36, a supply 106 of skin segments 108 for forming a skin 30, and a layup mandrel 110 for receiving the tubular stringers 36 and the skin 30 for formation and assembly of a stiffened composite structure 12. As schematically and optionally illustrated in FIG. 6, a system 100 may include a table rolling machine 112 configured to operatively receive at least the wrapping mandrel 52 portion of a tool 50 for operatively forming a tubular structure 62 from a pliable blank 104.

The layup mandrel 110 may take any suitable form depending on the configuration of stiffened composite structure 12 being assembled and/or on any other suitable criteria. The layup mandrel 110 may take the form of an inner mold line layup mandrel, in which case the tubular stringers 36 are loaded onto the layup mandrel 110 prior to the loading of a skin segment 108 on the layup mandrel 110. Alternatively, the layup mandrel 110 may take the form of an outer mold line layup mandrel, in which case a skin segment 108 is loaded onto the layup mandrel 110 prior to the loading of the tubular stringers 36. The layup mandrel 110 may correspond to such illustrative, non-exclusive examples of stiffened composite structures 12 as portions of aircraft 14, fuselages 16, sections 18 of fuselages 16, subsections 20 of sections 18 of fuselages 16, wings 22, horizontal stabilizers 24, vertical stabilizers 26, or portions or sections of spacecraft, watercraft, land vehicles, wind turbines, structural towers, structural masts, etc.

A system 100 also may include a supply 114 of cure mandrels 56, from which a cure mandrel 56 is selected to receive and carry a respective tubular stringer 36 from the transition mandrel 56 for operative loading of the tubular stringer 36 on the layup mandrel 110. In FIG. 6, the tool 50 is schematically illustrated in an overlapping relationship with a cure mandrel 56, schematically representing that a cure mandrel 56 may be considered to be a component of a tool 50. Additionally or alternatively, a cure mandrel 56 may be described as being configured for operative use with a tool 50 to receive and carry a tubular stringer 36 from the tool 50 to the layup mandrel 110.

As schematically illustrated in FIG. 5, a method 210 includes repeating the wrapping 202 and the transitioning 204, as indicated at 212, to form a plurality of tubular stringers 36. After the repeating 212, or concurrently therewith, a method 210 includes operatively loading the plurality of tubular stringers 36 on the layup mandrel 110, as indicated at 214, and operatively loading a skin segment 108 on the layup mandrel 110 relative to the plurality of tubular stringers 36, as indicated at 216, to define at least a portion of a stiffened composite structure 12. Illustrative, non-exclusive examples of loading 216 skin segments 108 are disclosed in co-owned U.S. patent application Ser. No. 13/693,887, filed on Dec. 4, 2012 and entitled SYSTEMS AND METHODS FOR ASSEMBLING A SKIN OF A COMPOSITE STRUCTURE, the complete disclosure of which is incorporated herein by reference.

In some methods 210, the loading 214 of tubular stringers 36 and the loading 216 of a skin segment 108 may be repeated to define multiple portions of a stiffened composite structure 12, as indicated at 218. Then, as indicated at 220, a method 210 may include assembling the plurality of defined portions of the stiffened composite structure 12 to define the stiffened composite structure 12. Moreover, depending on the configuration of stiffened composite structure 12 and/or on the materials used to construct the stiffened composite structure 12, after the loading 214 and the loading 216, a method 210 may include curing the stiffened composite structure 12, or a portion thereof, as indicated at 222.

Figure 7:
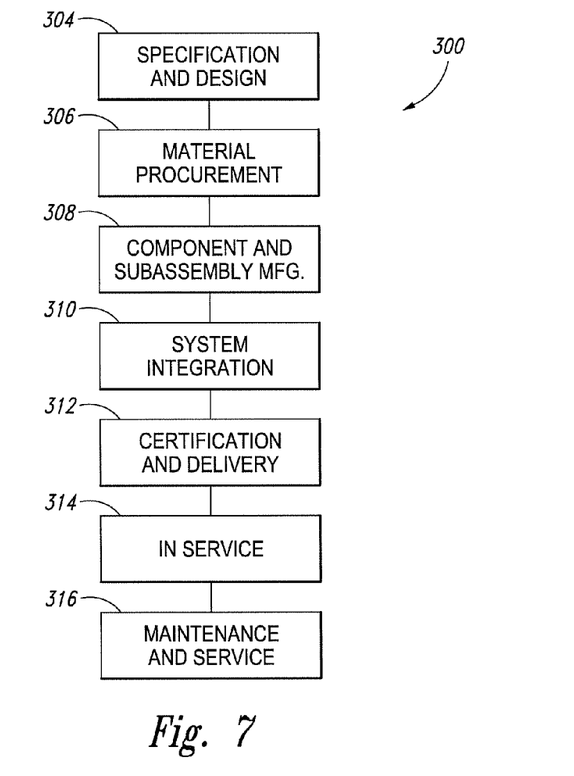
FIG. 7 is a flowchart schematically representing aircraft production and service methodology.
Figure 8:
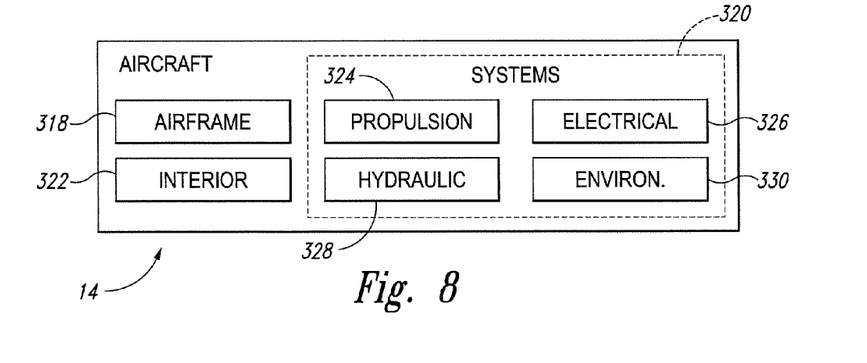
FIG. 8 is a block diagram schematically representing an aircraft.

Turning now to FIGS. 7-8, embodiments of the present disclosure may be described in the context of an aircraft manufacturing and service method 300 as shown in FIG. 7 and an aircraft 14 as shown in FIG. 8. During pre-production, exemplary method 300 may include specification and design 304 of the aircraft 14 and material procurement 306. During production, component and subassembly manufacturing 308 and system integration 310 of the aircraft 14 takes place. Thereafter, the aircraft 14 may go through certification and delivery 312 in order to be placed in service 314. While in service by a customer, the aircraft 14 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 14 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems also may be included. Although an aerospace example is shown, the principles of the inventions disclosed herein may be applied to other industries, such as the automotive industry.

Apparatus and methods disclosed herein may be employed during any one or more of the stages of the production and service method 300. For example, components or subassemblies corresponding to production process 308 may be fabricated or manufactured in a manner similar to components or subassemblies produced while the aircraft 14 is in service. Also, one or more apparatus embodiments, method embodiments, or a combination thereof may be utilized during the production stages 308 and 310, for example, by substantially expediting assembly of or reducing the cost of an aircraft 14. Similarly, one or more of apparatus embodiments, method embodiments, or a combination thereof may be utilized while the aircraft 14 is in service, for example and without limitation, during maintenance and service 316.

Illustrative, non-exclusive examples of inventive subject matter according to the present disclosure are described in the following enumerated paragraphs:

A. A tool for forming composite tubular stringers from a pliable blank, the tool comprising:

a wrapping mandrel, the wrapping mandrel having a wrapping-mandrel length and a wrapping-mandrel outer surface with (i) a generally uniform perpendicular cross-sectional wrapping-mandrel shape along the wrapping-mandrel length and (ii) a generally uniform perpendicular cross-sectional wrapping-mandrel circumference along the wrapping-mandrel length, wherein the wrapping-mandrel outer surface is configured (i) to receive the pliable blank to conform the pliable blank to the wrapping-mandrel outer surface to form a tubular structure having a continuous perimeter and (ii) to permit translation of the tubular structure relative to the wrapping mandrel; and a transition mandrel, the transition mandrel having a transition-mandrel length and a transition-mandrel outer surface with (i) a non-uniform perpendicular cross-sectional transition-mandrel shape that transitions along the transition-mandrel length from a first shape that corresponds to the wrapping-mandrel shape to a second shape that is different from the wrapping-mandrel shape and (ii) a generally uniform perpendicular cross-sectional transition-mandrel circumference along the transition-mandrel length, wherein the transition-mandrel outer surface is configured (i) to receive the tubular structure from the wrapping-mandrel outer surface and (ii) to permit translation of the tubular structure relative to the transition mandrel to conform the tubular structure to the second shape and thus to form a tubular stringer from the tubular structure.

A1. The tool of paragraph A, wherein the wrapping-mandrel circumference is generally equal to the transition-mandrel circumference.

A2. The tool of any of paragraphs A-A1, wherein the wrapping-mandrel circumference and the transition-mandrel circumference is in the range of 1-5, 1-10, 1-20, 1-30, 1-50, 5-50, 5-30, 5-20, 5-10, 10-50, 10-30, 10-20, 20-50, 20-30, or 30-50 inches.

A3. The tool of any of paragraphs A-A2, wherein the wrapping-mandrel length is greater than the transition-mandrel length.

A3.1 The tool of paragraph A3, wherein the wrapping-mandrel length is greater than 2, 6, 8, 10, 15, 20, 30, 40, or 50 feet, and wherein the transition-mandrel length is less than 10, 8, 6, 4, or 2 feet.

A4. The tool of any of paragraphs A-A3.1, wherein the wrapping-mandrel shape is generally circular.

A5. The tool of any of paragraphs A-A4, wherein the first shape is generally circular and the second shape is generally non-circular.

A6. The tool of any of paragraphs A-A5, wherein the second shape is generally polygonal, is generally quadrilateral, is generally trapezoidal, is generally isosceles trapezoidal, is generally mound shaped with a generally flat base, has a generally flat side and a generally curvilinear side, or has a generally flat side and a generally convex side.

A7. The tool of any of paragraphs A-A6, wherein the transition mandrel is operatively coupled to the wrapping mandrel.

A8. The tool of any of paragraphs A-A6, wherein the transition mandrel is configured to be selectively and operatively coupled to and decoupled from the wrapping mandrel.

A9. The tool of any of paragraphs A-A8, wherein the wrapping mandrel and the transition mandrel define separate and distinct structures.

A10. The tool of any of paragraphs A-A6, wherein the wrapping mandrel and the transition mandrel define a unitary structure.

A11. The tool of any of paragraphs A-A10, wherein the wrapping-mandrel outer surface is defined by a low-friction material, and optionally by one of a polytetrafluoroethylene and a polyoxymethylene, to permit translation of the tubular structure relative to the wrapping mandrel along the wrapping-mandrel length.

A12. The tool of any of any of paragraphs A-A10, wherein the transition-mandrel outer surface is defined by a low-friction material, and optionally by one of a polytetrafluoroethylene and a polyoxymethylene, to permit translation of the tubular structure relative to the transition mandrel along the transition-mandrel length.

A12. The tool of any of paragraphs A-A11, further comprising:

a table roller configured to operatively wrap the pliable blank around the wrapping mandrel to conform the pliable blank to the wrapping-mandrel outer surface.

A13. The tool of any of paragraphs A-A12, further comprising:

a cure mandrel, the cure mandrel having a cure-mandrel length and a cure-mandrel outer surface with (i) a generally uniform perpendicular cross-sectional cure-mandrel shape along the cure-mandrel length that corresponds to the second shape and (ii) a generally uniform perpendicular cross-sectional cure-mandrel circumference along the cure-mandrel length, wherein the cure-mandrel outer surface is configured (i) to receive the tubular structure from the transition-mandrel outer surface and (ii) to permit translation of the tubular structure relative to the cure mandrel.

A13.1 The tool of paragraph A13, wherein the cure-mandrel circumference is generally equal to the wrapping-mandrel circumference and/or the transition-mandrel circumference.

A13.2 The tool of any of paragraphs A-A13.1, wherein the cure-mandrel circumference is less than the wrapping-mandrel circumference and/or the transition-mandrel circumference, optionally in the range of 0-1% less than the wrapping-mandrel circumference and/or the transition-mandrel circumference.

A13.3 The tool of any of paragraphs A-A13.2, wherein the cure mandrel includes a cure-mandrel body, a breather sock extending over the cure-mandrel body, and heat shrink material extending over the breather sock.

A13.4 The tool of any of paragraphs A-A13.3, further comprising:

a fixture configured to operatively align the cure mandrel with the transition mandrel for operative translation of the tubular structure from the wrapping mandrel to the transition mandrel to the cure mandrel.

A14. The tool of any of paragraphs A-A13.4 in combination with the tubular structure being formed with the tool.

A14.1 The combination of paragraph A14, wherein the tubular structure extends over and is engaged with the wrapping-mandrel outer surface and the transition-mandrel outer surface.

A14.1.1 The combination of paragraph A14.1 when depending from any of paragraphs A13-A13.4, wherein the tubular structure further extends over and is engaged with the cure-mandrel outer surface.

A14.2 The combination of any of paragraphs A14-A14.1.1, wherein the tubular structure is constructed of fiber reinforced composite material, and optionally of pre-preg composite plies.

B. A system for assembling a stiffened composite structure, the system comprising:

the tool of any of paragraphs A-A14.2;

a supply of pliable blanks for forming with the tool a plurality of composite tubular stringers of the stiffened composite structure;

a supply of skin segments for forming a skin of the stiffened composite structure; and a layup mandrel for receiving the plurality of composite tubular stringers and the skin for forming the stiffened composite structure.

B1. The system of paragraph B, further comprising:

a supply of cure mandrels, wherein each cure mandrel is configured to carry a respective composite tubular stringer for loading on the layup mandrel.

B2. The system of any of paragraphs B-B1, wherein the pliable blanks are constructed of fiber reinforced composite material, and optionally of pre-preg composite plies.

B3. The system of any of paragraphs B-B2, wherein the skin segments are constructed of fiber reinforced composite material, and optionally of pre-preg composite plies.

C. A method of forming a composite tubular stringer, the method comprising:

wrapping a pliable blank around a wrapping mandrel to define a tubular structure having a first circumferential profile with a continuous perimeter; and following the wrapping, transitioning the tubular structure from having the first circumferential profile to having a second circumferential profile that is different from the first circumferential profile to thereby define the composite tubular stringer.

C1. The method of paragraph C, wherein the transitioning includes translating the tubular structure from around the wrapping mandrel to around a cure mandrel, wherein the cure mandrel has a cure-mandrel outer surface with a generally uniform perpendicular cross-sectional cure-mandrel shape that corresponds to the second circumferential profile of the tubular structure.

C2. The method of any of paragraphs C-C1, wherein the wrapping and the transitioning utilize the tool of any of paragraphs A-A14.2.

C2.1 The method of paragraph C2, wherein the transitioning includes translating the tubular structure from around the wrapping mandrel to around the transition mandrel.

C2.1.1 The method of paragraph C2.1 when depending from any of paragraphs A13-A13.4, wherein the transitioning further includes translating the tubular structure from around the wrapping mandrel to around the cure mandrel via the transition mandrel.

C3. A method of forming a stiffened composite structure, the method comprising:

performing the method of any of paragraphs C-C2.1.1;

repeating the performing to form a plurality of composite tubular stringers having the second circumferential profile;

operatively loading the plurality of composite tubular stringers on a layup mandrel; and operatively loading a skin segment on the layup mandrel relative to the plurality of composite tubular stringers to define a portion of the stiffened composite structure.

C3.1 The method of paragraph C3, further comprising:

repeating the operatively loading the plurality of composite tubular stringers and the operatively loading a skin segment; and assembling a plurality of defined portions of the stiffened composite structure to produce the stiffened composite structure.

C3.2 The method of any of paragraphs C3-C3.1, further comprising:

following the operatively loading the plurality of composite tubular stringers and the operatively loading a skin segment, curing the stiffened composite structure.

C3.3 The method of any of paragraphs C3-C3.2, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

C3.4 The method of any of paragraphs C3-C3.3, wherein the pliable blank is constructed of fiber reinforced composite material, and optionally of pre-preg composite plies.

C3.5 The method of any of paragraphs C3-C3.4, wherein the skin segment is constructed of fiber reinforced composite material, and optionally of pre-preg composite plies.

C3.6 The method of any of paragraphs C3-C3.4, wherein the method utilizes the system of any of paragraphs B-B3.

D. An apparatus constructed utilizing the tool of any of paragraphs A-A14.2, the system of any of paragraphs B-B3, and/or the method of any of paragraphs C-C3.6.

E. An apparatus, comprising:

a composite tubular stringer constructed of fiber reinforced composite material.

E1. The apparatus of paragraph E, wherein the composite tubular stringer has a non-circular cross-sectional profile, optionally wherein the non-circular cross-sectional profile has a generally polygonal shape, a generally quadrilateral shape, a generally trapezoidal shape, a generally isosceles trapezoidal shape, and a generally mound shape with a generally flat base, a generally flat side and a generally curvilinear side, or a generally flat side and a generally convex side.

F. An aircraft, comprising:
  a fuselage, wherein the fuselage is constructed of a stiffened composite structure, wherein the stiffened composite structure includes:
    a skin; and
    a plurality of composite tubular stringers that are operatively coupled to and that extend longitudinally along an inner side of the skin and that are spaced circumferentially around the fuselage.

F1. The aircraft of paragraph F, wherein the tubular composite stringers are constructed of fiber reinforced composite material, and optionally of pre-preg composite plies.

F2. The apparatus of any of paragraphs F-F1, wherein the composite tubular stringers have non-circular cross-sectional profiles, optionally wherein the non-circular cross-sectional profiles have a generally polygonal shape, a generally quadrilateral shape, a generally trapezoidal shape, a generally isosceles trapezoidal shape, and a generally mound shape with a generally flat base, a generally flat side and a generally curvilinear side, or a generally flat side and a generally convex side.

F3. The aircraft of any of paragraphs F-F2, wherein the composite tubular stringers were constructed utilizing the tool of any of paragraphs A-A14.2, the system of any of paragraphs B-B3, and/or the method of any of paragraphs C-C3.6.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

In the event that any of the patent documents that are incorporated by reference herein define a term in a manner that is inconsistent with either the non-incorporated disclosure of the present application or with any of the other incorporated patent documents, the non-incorporated disclosure of the present application shall control with respect to the present application, and the term or terms as used in an incorporated patent document shall only control with respect to the document in which the term or terms are defined.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of forming a composite tubular stringer, the method comprising:
  wrapping a pliable blank around a wrapping mandrel to define a tubular structure having a first circumferential profile with a continuous perimeter, wherein the pliable blank is constructed of multiple layers of pre-preg sheets of partially cured fiber reinforced composite material;
  following the wrapping, transitioning the tubular structure from having the first circumferential profile to having a second circumferential profile that is different from the first circumferential profile to thereby define the composite tubular stringer, wherein the transitioning includes translating the tubular structure from around the wrapping mandrel to around a cure mandrel that is separate from the wrapping mandrel, wherein the cure mandrel has a cure-mandrel outer surface with a generally uniform perpendicular cross-sectional cure-mandrel shape that corresponds to the second circumferential profile of the tubular structure, and wherein the cure mandrel is selectively positioned relative to the wrapping mandrel for receipt of the tubular structure and to selectively carry the tubular structure from relative to the wrapping mandrel to a layup mandrel for subsequent assembly and curing of a stiffened composite structure; and operatively loading the composite tubular stringer together with the cure mandrel on the layup mandrel.

2. The method of claim 1, wherein the wrapping and the transitioning utilize a tool that comprises:
  the wrapping mandrel, wherein the wrapping mandrel has a wrapping-mandrel length and a wrapping-mandrel outer surface with (i) a generally uniform perpendicular cross-sectional wrapping-mandrel shape along the wrapping-mandrel length and corresponding to the first circumferential profile and (ii) a generally uniform perpendicular cross-sectional wrapping-mandrel circumference along the wrapping-mandrel length; and
  a transition mandrel, the transition mandrel having a transition-mandrel length and a transition-mandrel outer surface with (i) a non-uniform perpendicular cross-sectional transition-mandrel shape that transitions along the transition-mandrel length from a first shape that corresponds to the wrapping-mandrel shape to a second shape that is different from the wrapping-mandrel shape and that corresponds to the second circumferential profile of the tubular structure, and (ii) a generally uniform perpendicular cross-sectional transition-mandrel circumference along the transition-mandrel length;
  wherein the transitioning includes translating the tubular structure from around the wrapping mandrel to around the cure mandrel via the transition mandrel.

3. The method of claim 2, wherein the wrapping-mandrel circumference is generally equal to the transition-mandrel circumference.

4. The method of claim 2, wherein the wrapping-mandrel length is greater than the transition-mandrel length.

5. The method of claim 2, wherein the first circumferential profile is generally circular and the second circumferential profile is generally non-circular.

6. The method of claim 2, wherein the second circumferential profile is generally trapezoidal.

7. The method of claim 2, wherein the second circumferential profile is generally mound shaped with a generally flat base.

8. The method of claim 2, wherein the transition mandrel is operatively coupled to the wrapping mandrel.

9. The method of claim 2, wherein the wrapping mandrel and the transition mandrel define separate and distinct structures.

10. The method of claim 2, wherein the wrapping mandrel and the transition mandrel define a unitary structure.

11. A method of forming a stiffened composite structure, the method comprising:
performing the method of claim 1;
repeating the performing to form a plurality of composite tubular stringers having the second circumferential profile and being wrapped around respective cure mandrels and to
operatively load the plurality of composite tubular stringers together with the respective cure mandrels on the layup mandrel; and
operatively loading a skin segment on the layup mandrel relative to the plurality of composite tubular stringers to define a portion of the stiffened composite structure.

12. The method of claim 11, further comprising:
repeating the operatively loading the plurality of composite tubular stringers and the operatively loading a skin segment; and
assembling a plurality of defined portions of the stiffened composite structure to produce the stiffened composite structure.

13. The method of claim 11, further comprising:
following the operatively loading the plurality of composite tubular stringers and the operatively loading the skin segment, curing the stiffened composite structure.

14. The method of claim 11, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

15. The method of claim 11, wherein the skin segment is constructed of fiber reinforced composite material.

16. A method of forming a stiffened composite structure, the method comprising:
wrapping a pliable blank around a wrapping mandrel to define a tubular structure having a first circumferential profile with a continuous perimeter, wherein the wrapping mandrel has a wrapping-mandrel length and a wrapping-mandrel outer surface with (i) a generally uniform perpendicular cross-sectional wrapping-mandrel shape along the wrapping-mandrel length and corresponding to the first circumferential profile and (ii) a generally uniform perpendicular cross-sectional wrapping-mandrel circumference along the wrapping-mandrel length, and wherein the pliable blank is constructed of multiple layers of pre-prep sheets of partially cured fiber reinforced composite material; and
following the wrapping, transitioning the tubular structure from having the first circumferential profile to having a second circumferential profile that is different from the first circumferential profile to thereby define a composite tubular stringer by translating the tubular structure from around the wrapping mandrel to around a cure mandrel via a transition mandrel, wherein the cure mandrel has a cure-mandrel length and a cure-mandrel outer surface with (i) a generally uniform perpendicular cross-sectional cure-mandrel shape that corresponds to the second circumferential profile of the tubular structure and (ii) a generally uniform perpendicular cross-sectional cure-mandrel circumference along the cure-mandrel length wherein the transition mandrel has a transition-mandrel length and a transition-mandrel outer surface with (i) a non-uniform perpendicular cross-sectional transition-mandrel shape that transitions along the transition-mandrel length from a first shape that corresponds to the wrapping-mandrel shape to a second shape that is different from the wrapping-mandrel shape and that corresponds to the second circumferential profile of the tubular structure and to the cure-mandrel shape and (ii) a generally uniform perpendicular cross-sectional transition-mandrel circumference along the transition-mandrel length, and wherein the wrapping-mandrel circumference, the cure-mandrel circumference, and the transition-mandrel circumference are generally equal to each other;
repeating the wrapping and the transitioning to form a plurality of composite tubular stringers having the second circumferential profile and being wrapped around the respective cure mandrels;
operatively loading the plurality of composite tubular stringers together with the respective cure mandrels on a layup mandrel; and
operatively loading a skin segment on the layup mandrel relative to the plurality of composite tubular stringers to define a portion of the stiffened composite structure.

17. The method of claim 1, wherein angles of fibers are varied between the multiple layers of pre-peg sheets.

18. The method of claim 16, wherein angles of fibers are varied between the multiple layers of pre-peg sheets.

* * * * *